United States Patent [19]
Dornberger

[11] 3,781,666
[45] Dec. 25, 1973

[54] APPARATUS INCLUDING A PAIR OF DISSIMILAR SPACED ELECTRODES FOR DETECTING FAULTS IN INSULATED WIRES

[75] Inventor: Georg Christian Ernst Dornberger, Phoenix, Ariz.

[73] Assignee: Western Electric Company, Incorporated, New York, N.Y.

[22] Filed: Apr. 6, 1972

[21] Appl. No.: 241,723

[52] U.S. Cl................................ 324/54, 324/61 R
[51] Int. Cl...................... G01r 31/16, G01r 31/08
[58] Field of Search...................... 324/52, 54, 61 P, 324/61 R

[56] References Cited
UNITED STATES PATENTS

| | | | |
|---|---|---|---|
| 3,241,061 | 3/1966 | Quittner................... | 324/61 |
| 2,099,112 | 11/1937 | Hill........................ | 324/54 |
| 2,125,630 | 8/1938 | Gooding.................... | 324/54 X |
| 2,360,944 | 10/1944 | Fruth....................... | 324/54 X |
| 3,039,051 | 6/1962 | Locher..................... | 324/61 P |
| 3,096,478 | 7/1963 | Brown...................... | 324/54 |

FOREIGN PATENTS OR APPLICATIONS

| | | | |
|---|---|---|---|
| 760,040 | 10/1953 | Germany................... | 324/54 |
| 416,308 | 6/1933 | Great Britain............. | 324/54 |

*Primary Examiner*—Gerard R. Strecker
*Attorney*—W. M. Kain et al.

[57] ABSTRACT

A twisted pair of insulated conductors is passed axially through a pair of longitudinally spaced, capacitive electrodes, each having a random distribution of conductive spheroids contained therein to center the wire within the electrodes, bring the electric field closer to the wires and obtain a uniform potential gradient therearound. The electrodes are tubular shaped, having equal diameters but unequal lengths and are held at a predetermined potential difference, for example, 2.5 kilovolts, by connecting them respectively to the opposite sides of a circuit arrangement including a high voltage transformer secondary winding in series with a resistor and a capacitor connected in parallel. During normal operation, the two electrodes, the wire insulation and the wires define a pair of parallel arms each consisting of two series-connected capacitors. As the twisted wire pair is passed through the electrodes, an insulation fault, for example, a bare wire, split insulation, void, short circuit between the wires, or runout of one or both wires, causes a breakdown of one or both capacitors. This abrupt change in capacitance generates a transient pulse in the circuit which may be detected, for example, by a sensing or pickup coil disposed around one of the circuit connecting wires, and may be amplified and utilized to stop the longitudinal advance of the twisted wire pair to permit the fault to be located and repaired.

6 Claims, 5 Drawing Figures

APPARATUS INCLUDING A PAIR OF DISSIMILAR SPACED ELECTRODES FOR DETECTING FAULTS IN INSULATED WIRES

BACKGROUND OF THE INVENTION

1. Field of the Invention

The present invention relates to methods of and apparatus for detecting faults in insulated wire and, more particularly, to methods of and apparatus for continuously detecting faults in one or both of a pair of longitudinally moving insulated wires which have been twisted together for subsequent incorporation into a communications cable.

2. Technical Consideration and Prior Art

In the manufacture of certain types of communications cable, wire conductors are sheathed with plastic insulating material, for example, polyethylene or polyvinyl chloride and a pair of these insulated wires are twisted together longitudinally to form a twisted wire pair. Thereafter, a plurality of these twisted wire pairs are stranded together to form a cable core which may be sheathed to form a finished cable.

Because of the difficulty in repairing wire faults in cable which may contain many pairs of twisted wires, every effort is made in the manufacturing thereof to detect, locate and repair these wire faults during the insulating or the twisting process, before the pairs are stranded into a cable core.

The prior art abounds with various techniques and apparatus for detecting faults in individual insulated wires. With few exceptions, apparatus suitable for use with individual conductors cannot, with any practicality, be utilized for testing twisted pairs of insulated wires.

Typically, the detection of both individual and coincidental faults in twisted pairs has been accomplished by passing the twisted wires longitudinally between a pair of probes held at a relatively high potential to the wires, which are grounded or connected to detector circuitry through a take-up reel. A fault occuring in one or more of the wires creates a discharge path for a capacitor which discharges to operate a fault detector.

An improved prior art apparatus for detecting a fault in a twisted pair of advancing insulated wires as the wires are being taken up on a grounded take-up reel includes a pair of similar high voltage probes located adjacent to the longitudinal path of the wires and spaced apart in the direction of travel thereof a distance equal to a preselected maximum allowable length for an insulating fault in one of the wires. The probes are connected to the opposite sides of a high voltage coil, which may be the secondary winding of a step-up transformer having its primary winding connected to a low a.c. voltage source, for example, a 115 volt source of alternating voltage. Under normal operations, the mutual capacitance of the insulated wires and the probes form a reactance tank circuit with the coil in which a leakage current to ground through the insulated wires and the grounded takeup reel normally increases at a substantially uniform rate. When a fault in one or both of the insulated wires passes adjacent to the probes, the mutual capacitance changes to alter the leakage current and generate a radio frequency transient in the reactance tank circuit to energize a detecting device.

While the improved apparatus represents a significant improvement over the prior art, it requires: (1) a secondary voltage in the order of 6 kilovolts when the wires are not grounded directly to the grounded takeup reel; (2) grounding of the wires directly to the grounded takeup reel to reduce the secondary voltage to operate in the area of 2 kilovolts and, (3) is dependent upon a leakage current to ground which requires in all cases the takeup reel to be grounded.

SUMMARY OF THE INVENTION

One object of the present invention is to provide a new and improved capacitive probe for detecting insulation faults in an elongated insulated conductor.

A further object of the present invention is to provide a new and improved method of and apparatus for detecting insulation faults in an insulated elongated conductor moving along a longitudinal path, which does not depend upon leakage current to ground, and hence does not require the wires to be grounded in any way, either directly or indirectly through a takeup reel.

A further object of the present invention is to provide a new and improved method of and apparatus for detecting individual or coincident faults in first and second conductors of a twisted pair of insulated elongated conductors at a substantially lower voltage level and at a substantially higher speed than the prior art.

A new and improved method of detecting an insulation fault in a longitudinally moving insulated elongated conductor, embodying certain features of the present invention, may include establishing first and second unequal capacitances, respectively, at and including first and second spaced sections of the elongated conductor, the inequality being sufficient to cause a sharp increase in the larger capacitance when a fault occurs in the insulation of the conductor section included therein and detecting the increase in capacitance.

A new and improved apparatus for detecting an insulation fault in an insulated elongated conductor moving along a longitudinal path, embodying certain features of the present invention, may include first and second spaced dissimilar electrodes, means for connecting the electrodes across a source of alternating voltage to establish a first capacitance having a predetermined value between the first electrode and a first conductor section and a second capacitance, substantially smaller than the first capacitance, between the second electrode and a second conductor section, the alternating voltage being sufficient to cause an increase in the first capacitance when an insulation fault passes through the first electrode to generate an electrical impulse and means for detecting the impulse.

The electrodes, may be hollow and, if of the same internal cross-sectional area, are of different lengths for establishing different values of capacitance with the conductor section therein.

BRIEF DESCRIPTION OF THE DRAWINGS

A more complete understanding of the invention will be obtained from the following detailed description of a specific embodiment thereof, when read in conjunction with the accompanying drawings, wherein.

DETAILED DESCRIPTION

Figure 1:
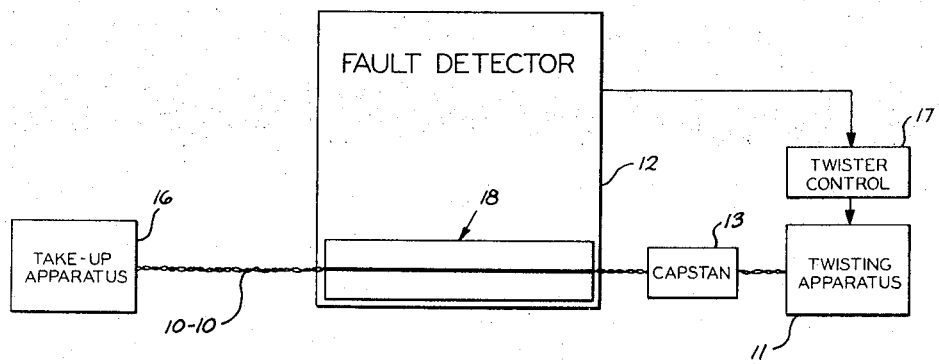
FIG. 1 is a block schematic diagram of a fault detecting arrangement, showing a greatly enlarged fault detector for a twisted pair of insulated conductors.

Referring to FIG. 1, a pair of insulated elongated conductors or wires 10—10, are twisted together into a twisted conductor pair in a twisting apparatus 11, and advanced longitudinally through an insulation fault detector 12 by conventional means, such as a capstan 13, and are thereafter take up on a suitable take-up apparatus 16. The fault detector 12 possesses the capability of detecting the most commonly found insulating faults in either or both of the wires 10—10, for example, a bare wire, splits in the insulation of one or both wires, and shorts between the wires. Additionally, the fault detector 12 is capable of detecting a runout condition of either or both wires and large-gap type opens in either or both of the conductors 10—10. Upon the detection of any of the foregoing faults, the fault detector 12 stops the operation of the twisting apparatus 11 through a twister control circuit 17, which controls the operation of the twisting apparatus 11. The twisted pair 10—10 may be advanced longitudinally at the speed of the twister 11, typically 1200 feet per minute, through a capacitive probe 18 mounted on the fault detector 12. It should be noted that the detector 12 is capable of functioning satisfactorily at substantially higher line speeds, limited essentially by the mechanical system utilized to advance the twisted pair 10—10.

Figure 2:
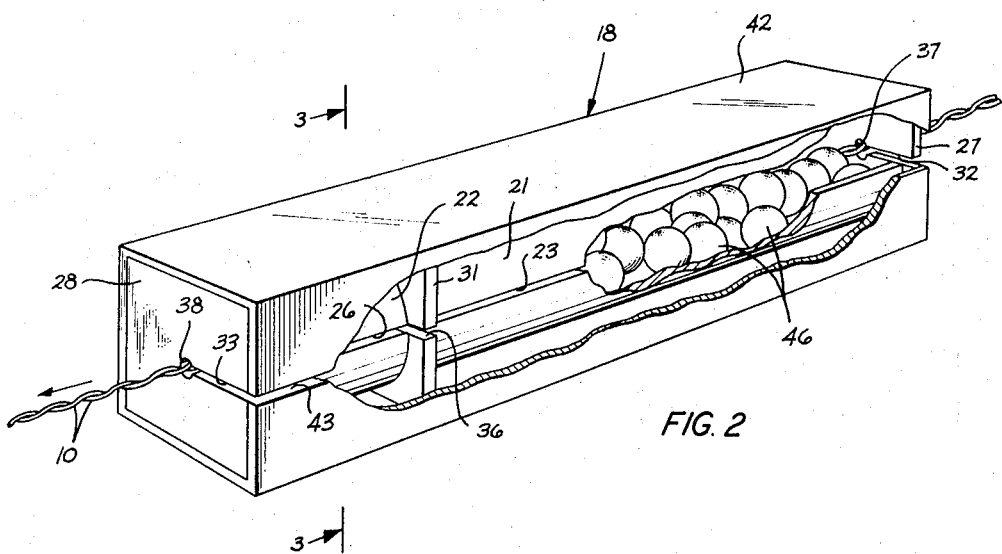
FIG. 2 is a perspective view, partially broken-away, of a probe assembly for the fault detector shown in FIG. 1.
Figure 3:
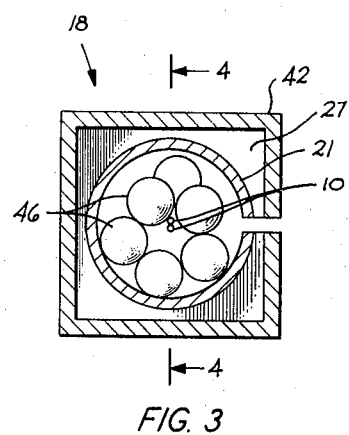
FIG. 3 is a cross-sectional view of a hollow electrode, which comprises part of the probe of FIG. 2, taken along the line 3—3 of FIG. 2, particularly showing a plurality of discrete electrically conductive elements within the electrode, surrounding a twisted conductor pair passed therethrough.
Figure 4:
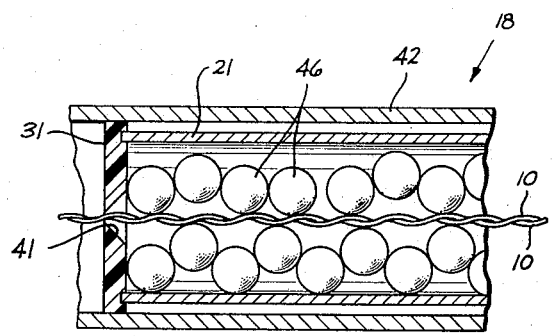
FIG. 4 is a sectional view of the hollow electrodes and conductive elements, taken along the line 4—4 of FIG. 3.

As shown in FIGS. 2–4, the probe 18 includes first and second coaxially aligned hollow electrodes 21 and 22, respectively, which are formed with correspondingly aligned longitudinal slots 23 and 26, respectively. For purposes more fully explained below, the electrodes 21 is of substantially longer axial length than the electrode 22, though of equal diameter. The electrodes 21 and 22 are supported in axially spaced relationship between a pair of end blocks 27 and 28 and an electrode-separating intermediate block 31, all made of a suitable insulating material, for example, polytetrafluoroethylene, or the like. The width of the separating block 31 may be approximately one-half inch. The blocks 27, 28 and 31 are formed with lateral cutouts 32, 33 and 36, respectively, which communicate with correspondingly aligned, centrally located countersunk guide apertures 37, 38 and 41, respectively, formed in the blocks 27, 28, and 31. A mounting bracket 42, which also functions as a shield for the probe 18, is formed around the electrodes 21 and 22 and the blocks 27, 28, and 31 to define a conductor access slot 43 aligned with the slots 23 and 26 in the electrodes 21 and 22 and the cutouts 32, 33, and 36 in the blocks 27, 28, and 31 respectively.

The hollow interior of or passageways through the tubular electrodes 21 and 22 are substantially filled with a plurality of randomly distributed discrete, electrically conductive elements 46—46, which may be conductive spheroids such as steel balls of the type commonly used in industry for reducing friction between moving metallic parts. The elements 46—46, may be, but are not necessarily, of equal diameter, for example, each measuring approximately one quarter of an inch. The wires 10—10 are passed through the probe 18 from right to left in FIGS. 1, 2, and 4, advancing through aperture 37 in block 27, electrode 21, aperture 41 in block 31, electrode 22 and aperture 38 in block 28. The twisted pair 10—10 passing through the electrodes 21 and 22 keep the elements 46—46 in continuous random motion around the twisted pair 10—10. The slots 23 and 26 formed in the electrodes 21 and 22 and the apertures 37, 38, and 41 in the blocks 27, 28, and 31 are small enough with respect to each of the elements 46—46 to prevent the escape thereof from the probe 18.

If an electrical potential is applied to either or both of the electrodes 21 and 22, potential differences exist between the electrodes 21 and 22 and the sections of the ungrounded twisted pair 10—10 therein, such that an electric field exists within the electrodes 21 and 22. The elements 46—46 serve to strengthen the electric field within the electrodes, increasing the voltage gradient between each conductor of the twisted pair 10—10 and the electrodes 21 and 22. Thus, the presence of the elements 46—46, which need not be made entirely of metal, but may be made of a conductive plastic material, allow a substantially lower, and therefore, a substantially safer electrical potential to be applied to the electrodes 21 and 22 than would be possible in the absence of the elements 46—46.

In addition to strengthening the electric field within the electrodes 21 and 22, the randomly arranged conductive elements 46—46, surrounding the twisted pair 10—10, serve also to center the twisted pair 10—10 as they are advanced longitudinally in a path coincident with the aligned central axes of the electrodes 21 and 22 and to make the voltage gradient therein uniform around the pair 10—10.

Figure 5:
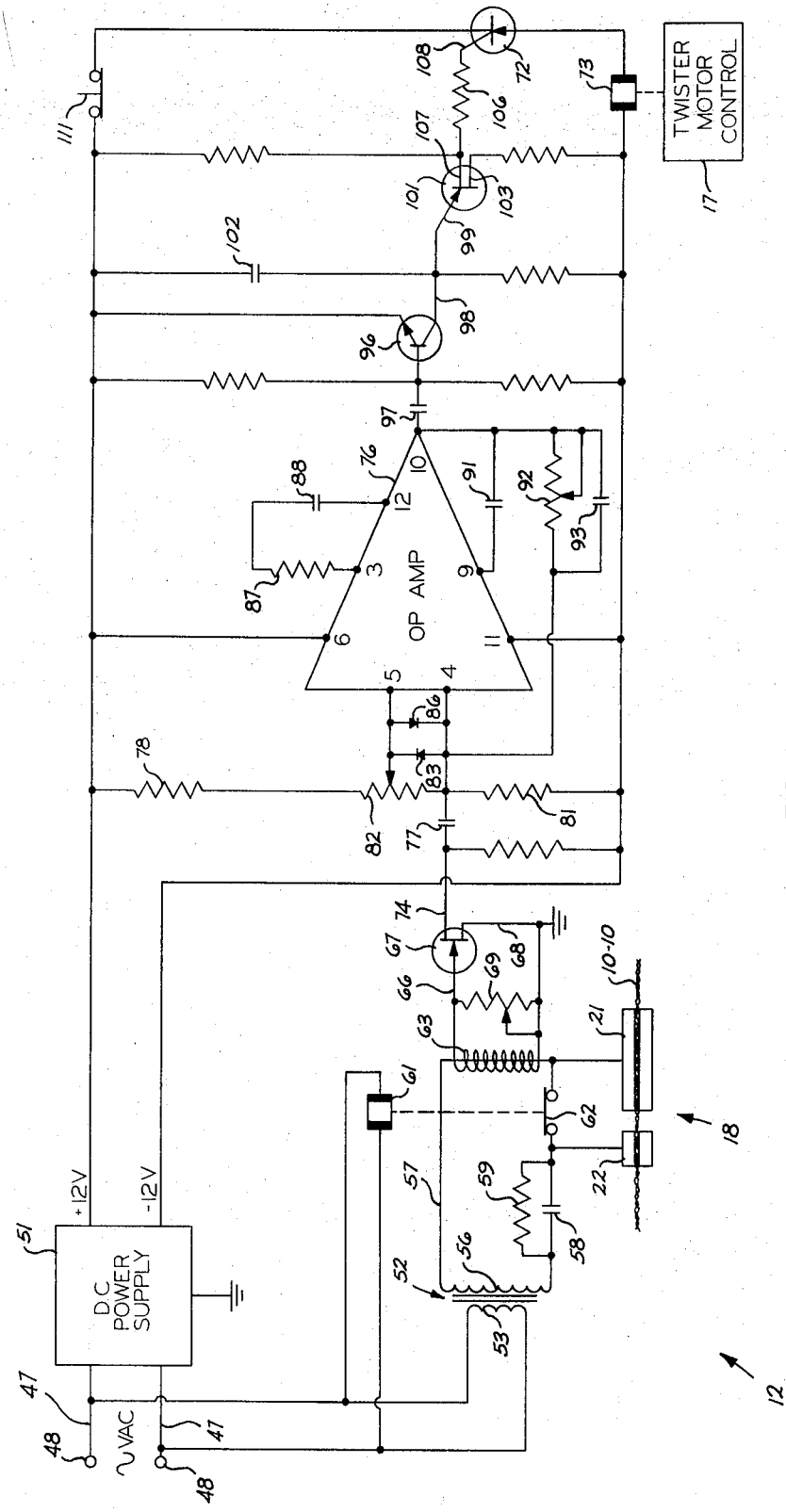
FIG. 5 is a detailed schematic illustration of the fault detector of FIG. 1.

Referring to FIG. 5, a circuit schematic for the fault detector 12 is shown. A pair of supply lines 47—47 are connected to a source of alternating voltage, for example, a 115 volt, 60 hz source at a pair of terminals 48—48. The lines 47—47 supply a.c. energy to a d.c. power supply 51 which provides operating potential at plus and minus 12 volts to amplification and switching stages in the fault detector 12.

An iron core step-up or high voltage transformer 52 includes a primary winding 53 connected across the supply lines 47—47, and a secondary winding 56. The transformer 52 steps up the 115 volts appearing at the terminals 48—48 to a high voltage, for example, 2.5 kilovolts across the secondary winding 56. One side of the winding 56 is connected to the electrode 21 through a conductor 57. The other side of the winding 56 is connected to the electrode 22 through the parallel arrangement of a capacitor 58 and a resistor 59. A relay 61, having a normally closed contact 62 is connected across the supply lines 47—47 for operator safety to short the electrodes 21 and 22 together through the contact 62 when energizing potential is not being supplied to the terminals 48—48. A sensing element in the form of a pick-up coil 63 is wound around the conductor 57. The pick-up coil 63 is grounded on one side to the chassis of the fault detector 12 and is connected on its other side to a gate electrode 66 of a field-effect transistor (FET) 67, having a grounded source electrode 68. A gate leak potentiometer 69 is connected across the pick-up coil 63, between the gate electrode 66 of FET 67 and ground.

In the preferred embodiment of the fault detector 12, the electrodes 21 and 22 are of substantially equal diameters, and have equal internal cross-sectional areas, but the axial length of the electrode 21 is substantially longer, approximately five times, than the axial length of the electrode 22. Therefore, from the theory of capacitance, the capacitance between the electrode 21 and each conductor of the twisted pair 10—10 is five times greater than the capacitance between the electrode 22 and the individual conductors of pair 10—10, and the potential difference between the electrode 22 and the pair 10—10 is five times the potential difference between the electrode 21 and the pair 10—10. The arrangement of the electrodes 21 and 22 and each conductor 10 thus defines first and second series capacitances of unequal value, the first capacitance being approximately five times the value of the second capacitance.

The individual conductors of the twisted pair may be sheathed with a suitable plastic insulating material, for example, polyethylene or polyvinyl chloride, the dielectric coefficients of which material are from two to three times greater than the dielectric coefficient of air. Thus, the high voltage gradient between each of the electrodes 21 and 22 and the twisted pair 10—10 can be withstood without breakdown or flashover occurring. However, if a fault in either wire 10—10 occurs, such as a bare wire, runout of one or both wires, split insulation, or a short between the wires, a breakdown of the air dielectric between the electrode 21, which first receives the wire section or sections containing the fault, occurs from the electrode 21 to the conductor wire containing the fault to the electrode 22. This breakdown is detected and amplified to trigger a silicon controlled rectifier 72 which energizes a relay 73 to stop the operation of the twisting apparatus 11 through the twister control circuit 17, for example, by opening the circuit of a run relay (not shown) therein.

An insulation fault in either or both of the conductors of the pair 10—10 passing through the probe 18 causes the capacitance between the first electrode 21 and the wire 10 containing the insulation fault to increase sharply, causing the potential difference therebetween to rise at a rate determined by the time constant of the series combination of the electrode-to-conductor capacitances, the capacitor 58 and the resistor 59. The increased potential difference between the electrode 21 and the wire 10 causes a voltage shift between the electrode-to-wire capacitances of the electrodes 21 and 22, and therefore an abrupt change in current in the conductor 57 generating a current impulse or spike therein which is sensed or picked-up by the inductively coupled coil 63 and amplified by the FET 67. A field effect transistor amplifier is advantageous because of its relatively small current drain.

The amplified pulse appears on a drain electrode 74 of the FET 67 which is coupled to one of two differential inputs to an operational amplifier 76, which may be, for example, a 8-terminal Ser. No. 52709N integrated circuit-type operational amplifier. More specifically, the output of FET 67 is coupled through a capacitor 77 to terminal 76-4 of the operational amplifier circuit 76. A reference voltage level is established at a second differential input to the amplifier 76 at terminal 76-5 thereof through a voltage divider including the series combination of a pair of resistors 78 and 81 and a potentiometer 82. A differential type input eliminates any common made noise signals appearing at ground or in the power supply lines of the detector 12. Isolation is provided between the input terminals 76-4 and 76-5 of the amplifier 76 by a pair of blocking diodes 83 and 86.

The operational amplifier 76 is provided with stabilizing feedback elements, for example, a series combination of a resistor 87 and a capacitor 88 connected between terminals 76-3 and 76-12, a capacitor 91 connected between terminals 76-9 and 76-10 and the parallel combination of a resistor or potentiometer 92 and a capacitor 93 connected between terminals 76-4 and 76-10. The foregoing feedback elements are chosen to bias the amplifier 76 to saturation at the positive d.c. supply voltage at terminal 76-10 thereof.

A pulse appearing on input 76-4 of the amplifier 76 drives the output 76-10 thereof negative to cut off a normally conducting transistor 96, which is coupled to the output of amplifier 76 through a capacitor 97, increasing the voltage at the collector 98 thereof. This voltage rise, which appears at a base 99 of a unijunction transistor 101, quickly attains a value exceeding the threshold level of the transistor 101, causing it to conduct. When the transistor 101 conducts a capacitor 102 discharges therethrough, generating a positive spike at a first base 103 of the transistor 101 causing a voltage rise across a resistor 106 which couples a second base 107 of the transistor 101 to a gate 108 of the silicon controlled rectifier 72. The voltage appearing at the gate 108 is of sufficient magnitude to cause the silicon controlled rectifier 72 to conduct and energize the relay 73 in the anode circuit of the silicon controlled rectifier 72 to operate a contact (not shown) in the twister control circuit 17 to stop the running of the twisting apparatus 11.

The fault may thereafter be repaired or eliminated and the fault detector 12 conditioned for subsequent operation by the actuation of a push-button switch 111 which may be opened to remove the anode potential from the silicon controlled rectifier 72, thus causing the gate 108 thereof to lose control and the silicon controlled rectifier 72 ceases to conduct.

In lieu of requiring an operator to recondition the circuit 12 for operation, an automatic time-out feature may be provided by those skilled in the art to de-energize relay 73 and turn off the silicon controlled rectifier 72 automatically after a predetermined amount of time.

Since solid state circuitry has been utilized in the circuit 12, it is capable of being housed in a relatively small enclosure which may be mounted directly on the twisting apparatus.

Additionally, the slotted tubular electrodes 21 and 22 and the slotted shield 42 aligned therewith, provide for simple lateral or side-loading of the twisted pair 10—10. The operator has merely to slide the pair 10—10 laterally into the probe 18 back and forth in a sawing motion to dislodge the elements 46—46 until the pair 10—10 is centered in the probe 18. Satisfactory detection of insulating faults in the twisted pair 10—10 will be obtained if the hollow passageway in electrodes 21 and 22 are filled each to about 75 percent of their volume with the conductive elements 46—46.

Although not specifically designed to detect opens in the conductors 10—10, the detector 12 will detect certain opens therein, namely, those in which the gap between the ends is sufficient to prevent arcing thereacross, thus defining a third capacitance serially between the two electrode-to-wire capacitances as the twisted pair 10—10 is passed through the probe 18. In such cases the gap capacitance is much smaller than either of the electrode-to-wire capacitances such that the inverse relationship of the voltages across the serial capacitances results in a voltage shift and a current pulse in the conductor 57 which may be detected and amplified to fire the silicon controlled rectifier 72 to energize the relay 73 to stop the twisting apparatus 11.

Though the preferred embodiment of the fault detector 12 has been described in connection with the detection of insulation faults in twisted conductor pairs, the operation of the apparatus is exactly the same and functions as well for individual insulated conductors.

Additionally, though the electrodes 21 and 22 are shown and described as being of equal internal diameters and different lengths, the same results may be obtained if the diameters are different and the lengths are equal, or any combination of the foregoing, as long as the electrode-to-wire capacitances are substantially different to produce the required voltage shift therebetween.

Finally, the use of spherical conductive elements in a hollow electrode is not limited to detectors of the type hereinabove described, but may be used for providing various types of electrical connections to an elongated conductor. For example, either of the electrodes 21 or 22 may be used in place of conventional high voltage bead chain electrodes commonly utilized to detect pinhole faults in wire insulation. Other applications of the methods and apparatus set forth may be devised without departing from the spirit and scope of the invention as defined and set forth in the claims.

What is claimed is:

1. An apparatus for detecting an insulation fault in an insulated elongated conductor moving along a longitudinal path, which comprises:

first and second dissimilar, spaced electrodes disposed adjacent to said longitudinal path;

means for connecting said electrodes across a source of alternating voltage to establish a first capacitance having a predetermined value between said first electrode and a first section of the elongated conductor and a second capacitance, serially connected to said first capacitance through the conductor, and having a predetermined value substantially less than said first capacitance, between said second electrode and a second section of the elongated conductor, said alternating voltage being sufficient to cause said first capacitance to increase when an insulation fault passes adjacent to said first electrode, to generate an electrical impulse in said series circuit; and means for detecting said generated impulse.

2. An apparatus as set forth in claim 1 wherein the value of said second capacitance is approximately one-fifth of the value of said first capacitance.

3. An apparatus as set forth in claim 1 wherein said first and second electrodes are hollow for receiving the conductor sections axially therein and have equal cross-sectional areas, and said first electrode has a substantially longer axial length than said second electrode.

4. An apparatus as set forth in claim 3 wherein the axial length of said first electrode is approximately five times the axial length of said second electrode.

5. An apparatus for detecting individual or coincident insulation faults in first and second conductors of a twisted pair of insulated elongated conductors, which comprises:

first and second dissimilar hollow electrodes disposed in spaced axial alignment with one another;

means for advancing the twisted pair along an axial path through said hollow electrodes;

means for connecting said electrodes across a source of alternating voltage to establish first and second capacitances, each having a predetermined value, between said first electrode and first and second adjacent sections of the first and second conductors, respectively, of the twisted pair and third and fourth capacitances, serially connected to said first and second capacitances, respectively, through said first and second conductors, respectively, each having a predetermined value substantially less than said first and second capacitances, between said second electrode and third and fourth adjacent sections of said first and second conductors, respectively, of the twisted pair, said alternating voltage being sufficient to cause one or both of said first and second capacitances to increase when an insulation fault in one or both conductors of said twisted pair passes through said first electrode, to generate an electrical impulse in the series circuit common to all of said established capacitances; and means for detecting said generated electrical impulse.

6. An apparatus as set forth in claim 5 wherein the value of said first and second capacitances are approximately one-fifth of the value of said third and fourth capacitances.

* * * * *